US007543030B2

(12) United States Patent
Hsieh et al.

(10) Patent No.: US 7,543,030 B2
(45) Date of Patent: Jun. 2, 2009

(54) PEER-TO-PEER COMMUNICATION FOR INSTANT MESSAGING BETWEEN DIFFERENT INSTANT MESSAGE APPLICATION TYPES

(75) Inventors: Wen-Tai Hsieh, Taipei (TW); Shih-Chun Chou, Taipei (TW); Yung-Fang Yang, Changhua County (TW); Lu-Ping Chang, Hsinchu (TW)

(73) Assignee: Institute for Information Industry, Taipei (TW)

( * ) Notice: Subject to any disclaimer, the term of this patent is extended or adjusted under 35 U.S.C. 154(b) by 419 days.

(21) Appl. No.: 10/945,964

(22) Filed: Sep. 22, 2004

(65) Prior Publication Data

US 2006/0020708 A1    Jan. 26, 2006

(30) Foreign Application Priority Data

Jun. 30, 2004    (TW) .............................. 93119495 A

(51) Int. Cl.
  *G06F 15/16*    (2006.01)
  *G06F 9/44*     (2006.01)
(52) U.S. Cl. .................. 709/206; 709/230; 719/311
(58) Field of Classification Search ......... 709/203–206, 709/227, 230; 455/417, 445; 719/310, 311, 719/312, 313
See application file for complete search history.

(56) References Cited

U.S. PATENT DOCUMENTS 6,950,651 B2 * 9/2005 Seligmann .................. 455/417
7,194,516 B2 * 3/2007 Giacobbe et al. ............ 709/206
7,200,634 B2 * 4/2007 Mendiola et al. ............ 709/204
2002/0055975 A1 * 5/2002 Petrovykh ................... 709/205
2003/0105812 A1 * 6/2003 Flowers et al. .............. 709/203
2003/0126213 A1 * 7/2003 Betzler ....................... 709/206
2003/0177184 A1 * 9/2003 Dickerman et al. ......... 709/204
2003/0221009 A1 * 11/2003 Standridge et al. .......... 709/227
2004/0249953 A1 * 12/2004 Fernandez et al. .......... 709/227
2005/0027810 A1 * 2/2005 Donovan .................... 709/206
2005/0037762 A1 * 2/2005 Gurbani et al. ............. 455/445

OTHER PUBLICATIONS

Mitsouka et al. "Instant Messaging with Mobile Phones to Support Awareness", 2001 IEEE, pp. 223-230.*
Vaughan-Nichols "Presence Technology: More than Just Instant Messaging", 2003 IEEE, pp. 11-13.*

* cited by examiner

*Primary Examiner*—Van H Nguyen
(74) *Attorney, Agent, or Firm*—Birch, Stewart, Kolasch & Birch, LLP

(57) ABSTRACT

An instant message is received from a first daemon corresponding to a first instant messaging application type originating with a first client, and transmits the instant message to a second daemon corresponding to a second instant messaging application type originating with a second client. A third daemon receives the instant message using communication protocol corresponding to the first instant messaging application type. A message switching unit acquires the second instant messaging application type corresponding to the third daemon identity, and acquires a second daemon identity. A fourth daemon transmits the instant message to the second daemon corresponding to the second daemon identity using communication protocol corresponding to the second instant messaging application type.

18 Claims, 11 Drawing Sheets

| User Account | E-mail Address | Nickname |
|---|---|---|
| Ted | Ted521@aaa.org | TedTed |
| Ben | Ben7777@aaa.org | BenBen |

| User Account | Initiating Instant Messaging Application Type | MSN Messenger Daemon ID | ICQ Daemon ID |
|---|---|---|---|
| Ted | MSN Messenger | Ted521@aaa.org | 11332244 |
| Ben | ICQ | Ben777@aaa.org | 22443311 |

PEER-TO-PEER COMMUNICATION FOR INSTANT MESSAGING BETWEEN DIFFERENT INSTANT MESSAGE APPLICATION TYPES

This Non-provisional application claims priority under 35 U.S.C. § 119(a) on Patent Application No(s). 093119495 filed in Taiwan, Republic of China on Jun. 30, 2004, the entire contents of which are hereby incorporated by reference.

BACKGROUND

The present invention relates to communication technology, and more particularly, to a system and method for peer-to-peer (P2P) communication between different protocol types.

Peer-to-peer networking utilizes relatively powerful computers (personal computers) as terminal nodes, enabling more than just client-based computing tasks. Since most PCs have very fast processors, vast memory, and large hard disks, none of which are normally utilized fully when performing common computing tasks such e-mail and Web browsing, the modern PC can easily act as both a client and server (a peer) for various types of applications.

For real-time communications (RTC), peer-to-peer networking enables serverless instant messaging. Computers can directly exchange text, graphics, audio or video files among peers. Peer-to-peer networking allows dissemination of text-based information in the form of files or messages to a large group of peer computers. Several types of instant messaging applications, such as MSN® messenger, ICQ®, Yahoo!® Messenger, QQ®, and the like, have been developed for RTC. During operation, a daemon for a particular instant messaging application (e.g., a MSN® messenger, ICQ®, Yahoo!® Messenger, QQ® daemon, and the like) is activated in a peer computer to facilitate exchange between like daemons. Daemons for different types of instant messaging applications, however, cannot communicate with each other. Therefore, a need exists for a system and method allowing p2p communication between users of different protocol types.

SUMMARY

An embodiment of the invention provides a system for peer-to-peer (p2p) communication in which an instant message is delivered by a first daemon for a first instant messaging application type originating with a first client, and the instant message is transmitted to a second daemon for delivery to a second instant messaging application type in a second client. The system comprises a third daemon, a message switching unit and a fourth daemon. The third daemon receives the instant message and a first daemon identity corresponding to the first daemon using the communication protocol of the first instant messaging application type, and acquires a third daemon identity corresponding to the third daemon. The message switching unit receives the instant message, the first daemon identity and the third daemon identity, acquires the second instant messaging application type corresponding to the third daemon identity, and acquires a second daemon identity corresponding to the second daemon according to the third daemon identity and the second instant messaging application type. The fourth daemon receives the instant message and the second daemon identity, and transmits the instant message to the second daemon corresponding to the second daemon identity using the communication protocol of the second instant messaging application type.

Also provided is a method for p2p communication, receiving an instant message from a first daemon corresponding to a first instant messaging application type in a first client, and transmitting the instant message to a second daemon corresponding to a second instant messaging application type in a second client. The method comprises receiving the instant message, a first daemon identity corresponding to the first daemon, and a third daemon identity, in which the first daemon identity and the third daemon identity correspond to the first instant messaging application type, acquiring the second instant messaging application type corresponding to the third daemon identity, acquiring a second daemon identity corresponding to the second daemon according to the third daemon identity and the second instant messaging application type, and directing a fourth daemon to transmit the instant message to the second daemon corresponding to the second daemon identity using the communication protocol of the second instant messaging application type.

Further provided is a machine-readable storage medium storing a computer program which, when executed, performs p2p communication by receiving an instant message from a first daemon corresponding to a first instant messaging application type in a first client, and transmitting the instant message to a second daemon corresponding to a second instant messaging application type in a second client.

BRIEF DESCRIPTION OF THE DRAWINGS

The aforementioned objects, features and advantages of the embodiments will become apparent by referring to the following detailed description of embodiments with reference to the accompanying drawings, wherein:

FIG. 4 is a diagram of two exemplary user profile records according to an embodiment of the invention;

FIG. 6 is a diagram of two exemplary daemon records according to an embodiment of the invention;

DETAILED DESCRIPTION OF THE INVENTION

Figure 1:
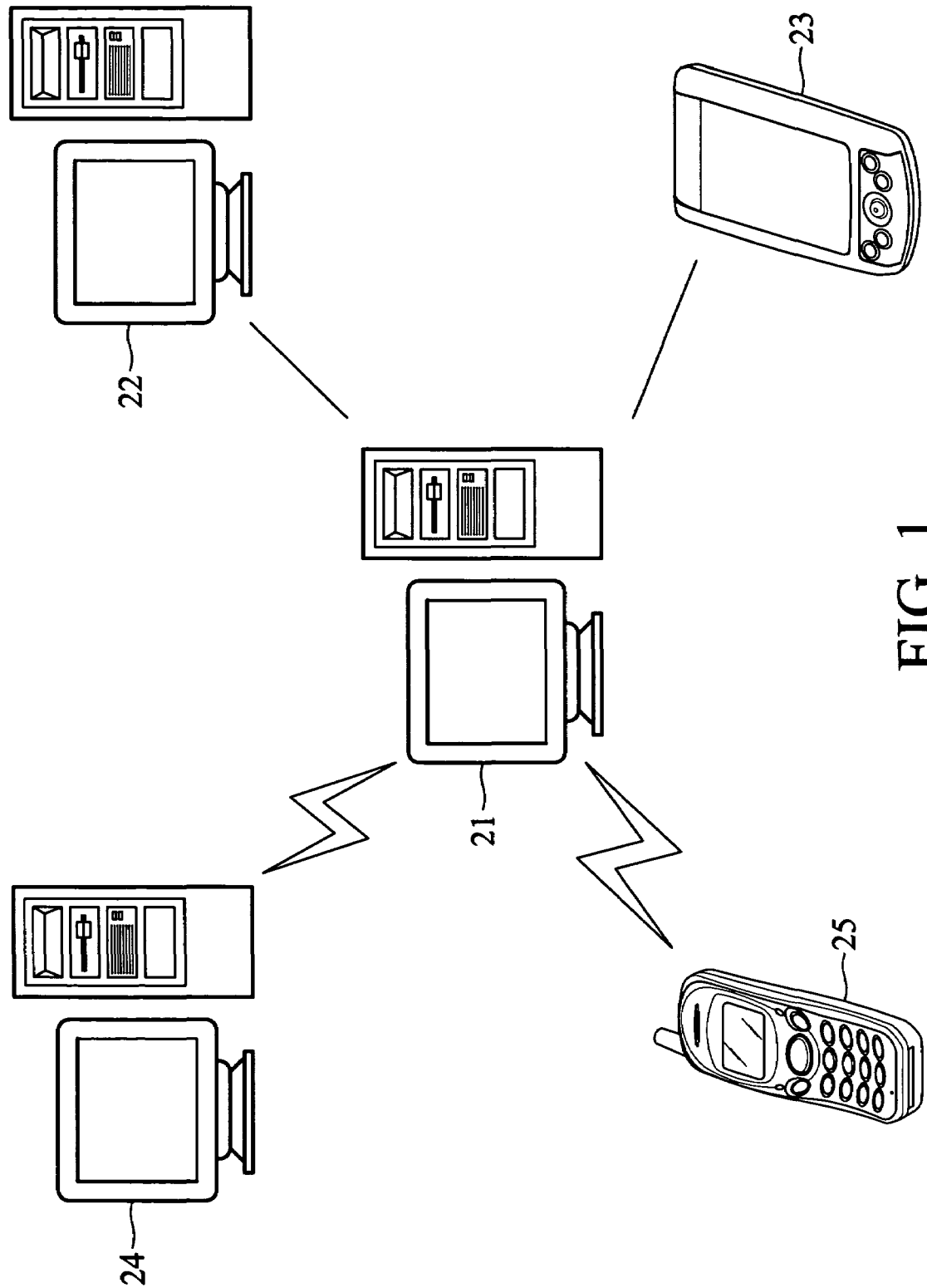
FIG. 1 is a diagram of a peer-to-peer (p2p) networking architecture according to an embodiment of the invention.

FIG. 1 is a diagram of an embodiment of a peer-to-peer (p2p) networking architecture. The p2p networking architecture comprises a p2p coordinator 21, computers 22 and 24, a personal digital assistant (PDA) 23 and mobile phone 25. The computer 22 and PDA 23 connect to the p2p coordinator 21 via a wire-based cabling scheme, and the computer 24 and mobile phone 25 connect to the p2p coordinator 21 via a wireless intermediate scheme such as radio frequency (RF), microwave and the like. Those skilled in the art will recognize that the computers 22 and 24, PDA 23, and mobile phone 25 may connect to the p2p coordinator 21 through multiple relay nodes such as access points, base stations, hubs, bridges, routers or other communication devices, not shown. Computers 22 and 24, PDA 23, and mobile phone 25 respectively has a daemon corresponding to a particular instant messaging application type, such as a MSN® messenger, ICQ®, Yahoo!® messenger, QQ® daemon, and the like, to exchange text, graphics, audio or video files, with like daemons in other terminal devices. In this example, the computer 22 comprises a daemon corresponding to a first instant messaging application type, for example a MSN® messenger daemon, with an identity "Ted521@aaa.org" and a nickname "TedTed", and the computer 24 comprises a daemon corresponding to a second instant messaging application type, for example an ICQ® daemon, with an identity "22443311" and a nickname "BenBen".

Figure 2:
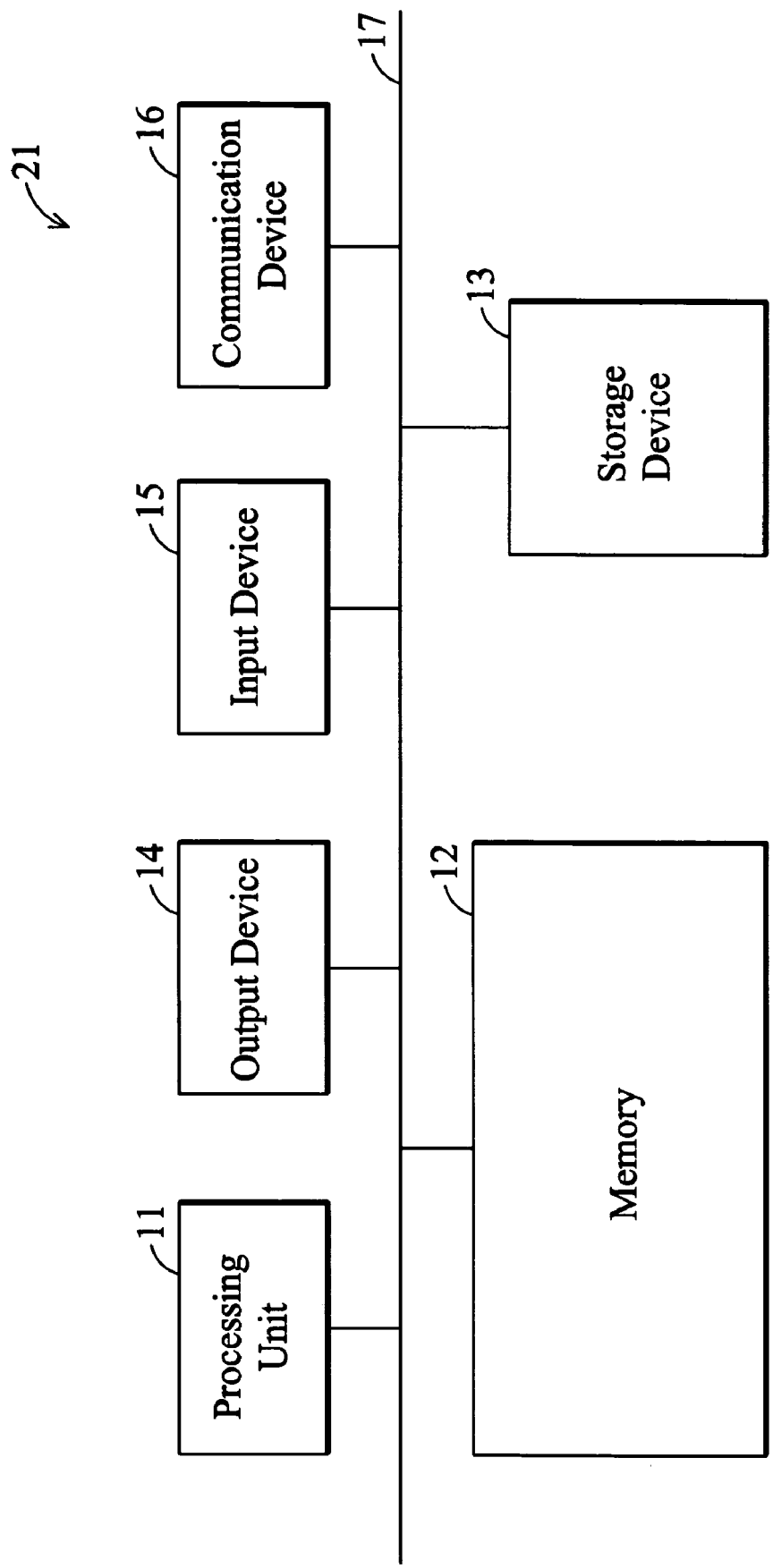
FIG. 2 is a diagram of a hardware environment of a p2p coordinator according to an embodiment of the invention.

FIG. 2 is a diagram of a hardware environment of a p2p coordinator. The description of FIG. 2 is provides a brief, general description of suitable computer hardware and a suitable computing environment in conjunction with which at least some embodiments may be implemented. The hardware environment of FIG. 2 includes a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 21, such that the processor of the computer comprises a single central processing unit (CPU), a micro processing unit (MPU) or multiple processing units, commonly referred to as a parallel processing environment. Memory 12 is preferably a random access memory (RAM), but may also include read-only memory (ROM) or flash ROM. The memory 12 preferably stores program modules executed by the processing unit 11 to perform p2p communication functions. Generally, program modules include routines, programs, objects, components, or others, that perform particular tasks or implement particular abstract data types. Those skilled in the art should understand that at least some embodiments may be practiced with other computer system configurations, including hand-held devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web object, Web Services or other similar architectures. The storage device 13 may be a hard drive, magnetic drive, optical drive, a portable drive, or nonvolatile memory drive. The drives and their associated computer-readable media (if required) provide nonvolatile storage of computer-readable instructions, data structures, program modules, texts, graphics, audio or video files. The communication device 16 may be an Ethernet drive or a wireless network drive compatible with 802.x or GPRS.

Figure 3:
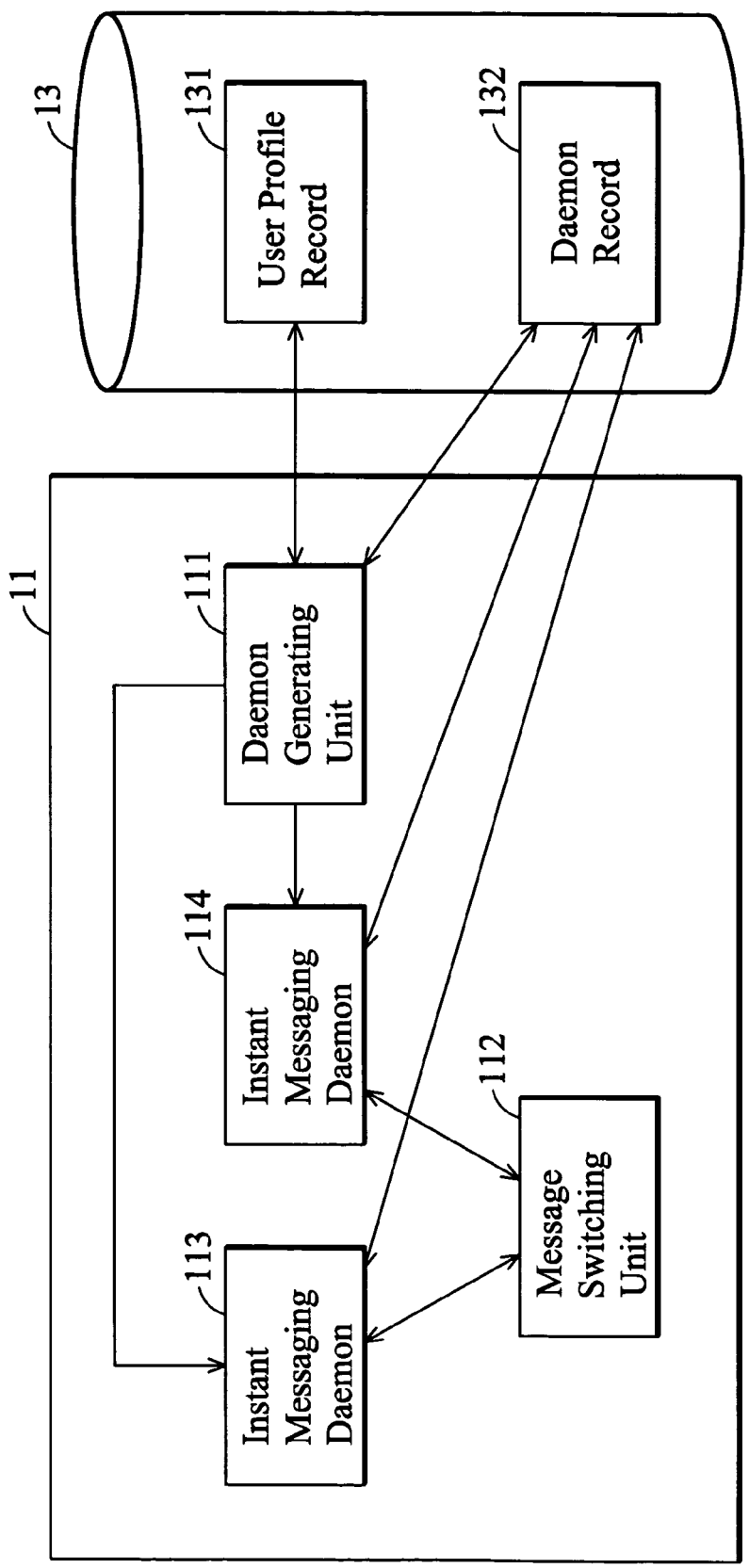
FIG. 3 is a diagram of software architecture of a p2p coordinator according to an embodiment of the invention.

FIG. 3 is a diagram of software architecture of a p2p coordinator. Program modules comprising a daemon generating unit 111 and a message switching unit 112 are stored in the memory 12, loaded and executed by the processing unit 11. The storage device 13 may comprise a database management system, an object base management system, a file management system, or others, to store multiple user profile records 131 and daemon records 132. Each user profile record 131, corresponding to a particular user, stores registration information for various centralized instant messaging servers (e.g., MSN® messenger server, ICQ® server, QQ® server, Yahoo!® Messenger server and the like), and preferably comprises several fields, such as user account, nickname, e-mail address, or others. Each daemon record 132, corresponding to a particular user, stores a user account, an instant messaging application type initiated by the user, and daemon identities for respective types of instant messaging applications. The user account in a daemon record 132 may be employed as a key to a particular user profile record 131. Consistent with the scope and spirit of the invention, additional or different fields may be provided in the user profile and daemon records. The implementation of user profile and daemon records described is not limited to a single table/file, but can implement multiple related tables/files. FIG. 4 is a diagram of two exemplary user profile records. User profile records 131a and 131b respectively correspond to user accounts "Ted" and "Ben". FIG. 6 is a diagram of two exemplary daemon records.

Figure 5:
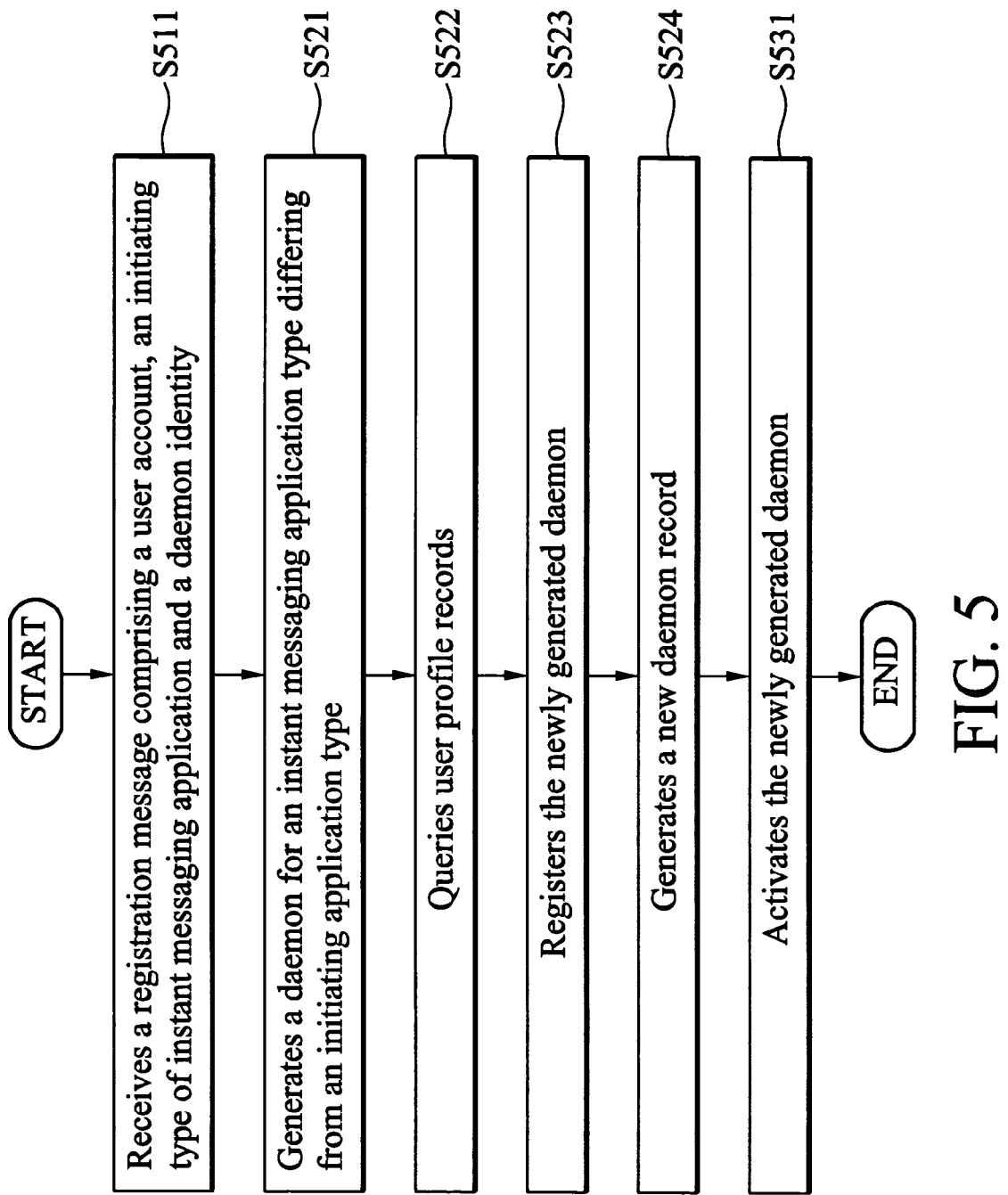
FIG. 5 is a flowchart showing a method for daemon generating according to an embodiment of the invention.

The daemon generating module 111 receives a registration message and subsequently generates daemons for various types of instant messaging applications. FIG. 5 is a flowchart showing a method for daemon generating according to an embodiment of the invention. In step S511, a registration message is received from computer 22, 24, PDA 23, or mobile phone 25 via the communication device 16, or from an operator via the input device 15. The registration message comprises a user account, initiating instant messaging application type and corresponding daemon identity. In step S521, at least one daemon for an instant messaging application type differing from the initiating application type, and identity thereof are generated. Generating of instant messaging daemons is well-known in the art, and is thus only described briefly herein. In step S522, registration information of the received user account is acquired by querying the user profile record 131. In step S523, the registration information and the generated daemon identity are provided to a corresponding instant messaging server (not shown) to register the newly generated daemon. Those skilled in the art will appreciate that the registration operation may follow a series of standard procedural steps to send messages to an instant messaging server, and the instant messaging server takes actions for new daemon registration accordingly. In step S524, a daemon record comprising the received user account, the initiating instant messaging application type (i.e., default instant messaging application type), and all daemon identities including both initiating and newly generated, is generated. In step S531, the newly generated daemon is activated.

Figure 7:
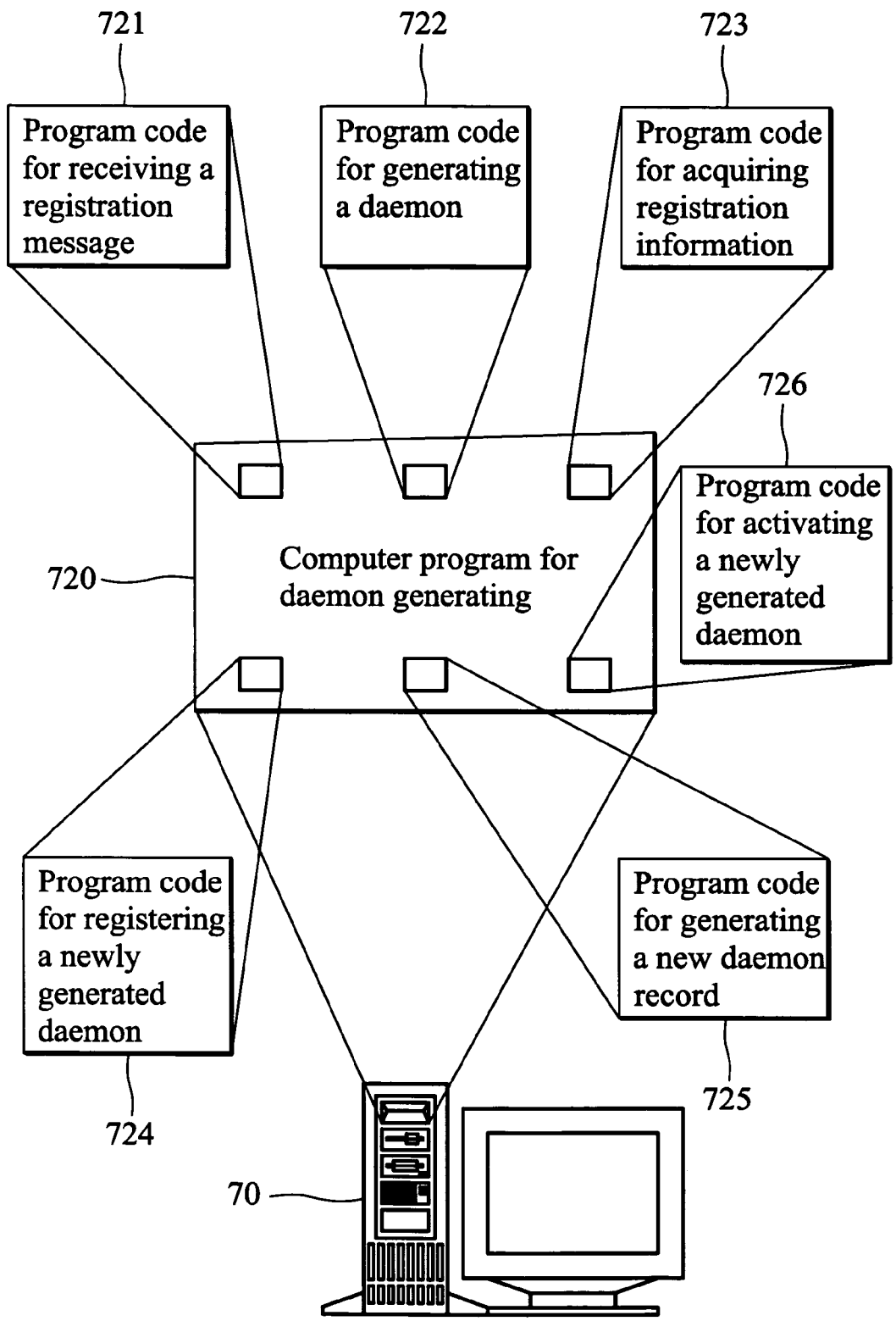
FIG. 7 is a diagram of a storage medium for a computer program providing the method of daemon generating according to an embodiment of the invention.

Also provided is a storage medium as shown in FIG. 7 storing a computer program 720 for executing the disclosed methods of daemon generating. The computer program product includes a storage medium 70 having computer readable program code embodied in the medium for use in a computer system, the computer readable program code comprising at least computer readable program code 721 receiving a registration message comprising a user account, an initiating instant messaging application type and corresponding daemon identity, computer readable program code 722 generating a daemon for an instant messaging application type differing from an initiating application type, and a daemon identity thereof, computer readable program code 723 acquiring registration information, computer readable program code 724 registering a newly generated daemon, computer readable program code 725 generating a new daemon record and computer readable program code 726 activating a newly generated daemon.

Details of the method for daemon generating are further described in two examples. In one example, referring to step S511, the daemon generating module 111 receives a registration message comprising user account "Ted", an initiating application type "MSN Messenger", and a corresponding daemon identity "Ted521@aaa.org" from the computer 22. In step S521, an instant messaging daemon 114 with a daemon identity "11332244" corresponding to an instant messaging application type, for example ICQ®, differing from the initiating application type is generated. The instant messaging daemon 114 may exchange text, graphics, audio or video files with other ICQ® daemons using a relevant protocol. In step S522, registration information of user account "Ted", such as nickname "TedTed", e-mail "Ted521@aaa.org" or others, is acquired from by querying the user profile record 131*a*. In step S523, the acquired registration information and the newly generated daemon identity "11332244" are provided to an ICQ® server supporting a corresponding instant messaging application type (not shown) for new daemon registration. In step S524, a daemon record as shown in 132*a* of FIG. 6 comprising the received user account, initiating instant messaging application type and MSN® Messenger daemon identity, and a newly generated ICQ® daemon identity, is generated. In step S531, the newly generated ICQ® daemon 114 is activated. In another example, referring to step S511, the daemon generating module 111 receives a registration message comprising user account "Ben", an initiating application type "ICQ" and a corresponding daemon identity "22443311" from computer 24. In step S521, an instant messaging daemon 113 with a daemon identity "Ben777@aaa.org" corresponding to MSN® Messenger differing from the initiating application type is generated. The instant messaging daemon 113 may exchange text, graphics, audio or video files with other MSN® Messenger daemons using a relevant protocol. In step S522, registration information of received user account "Ben", such as nickname "BenBen", e-mail "Ben777@aaa.org" or others, is acquired by querying the user profile record 131*b*. In step S523, the acquired registration information and the newly generated daemon identity "Ben777@aaa.org" are provided to an MSN® Messenger server supporting a corresponding instant messaging application type (not shown) for new daemon registration. In step S524, a daemon record as shown in 132*b* of FIG. 6 comprising the received user account, initiating instant messaging application type and ICQ® daemon identity, and a newly generated MSN® Messenger daemon identity, is generated. Referring to step S531, the newly generated MSN® Messenger daemon 113 is activated.

Figure 8:
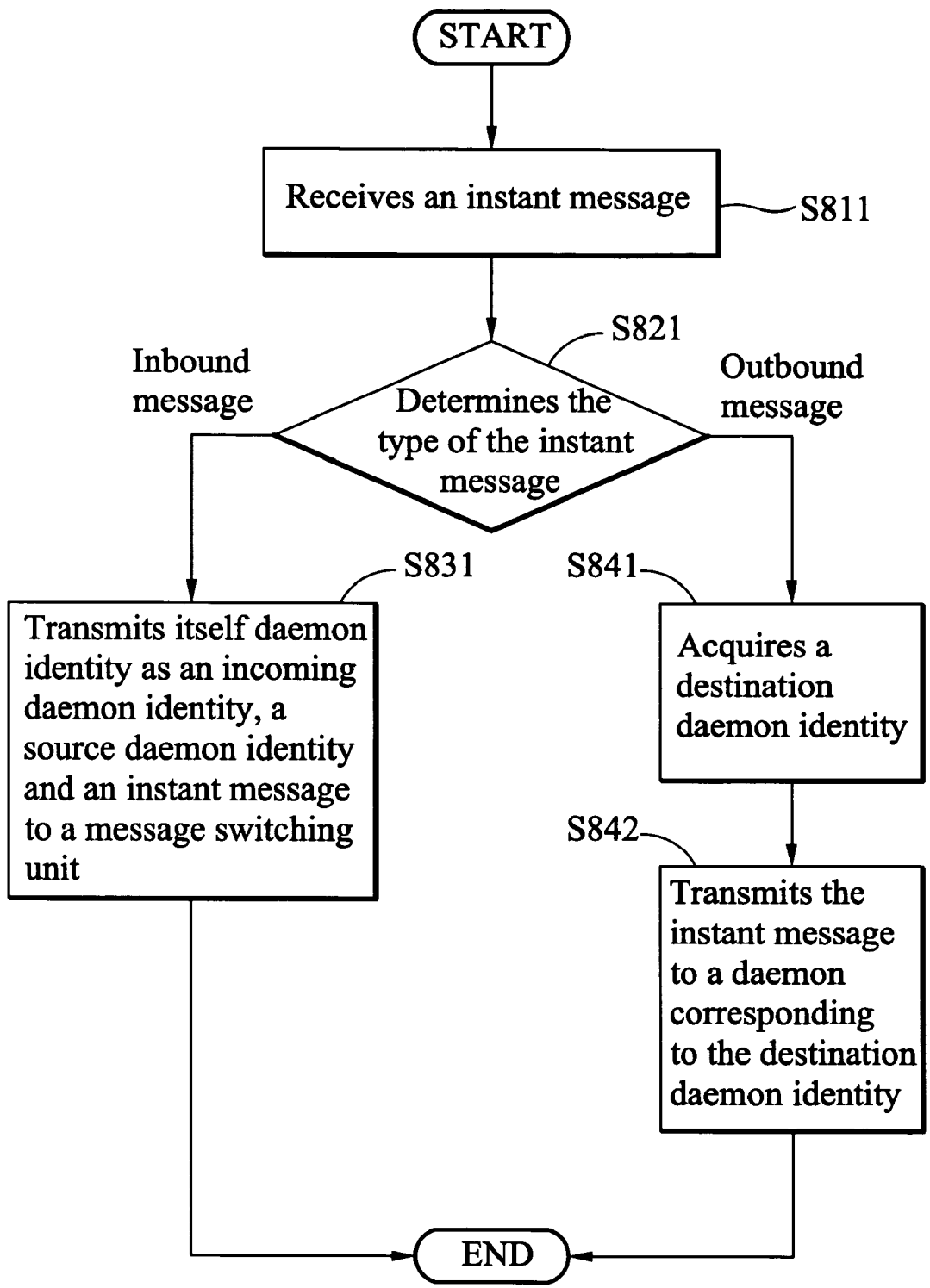
FIG. 8 is a flowchart showing a method for message transmission according to an embodiment of the invention.

Instant messaging daemons 113 and 114 execute a message transmission method to exchange text, graphics, video or audio files with other instant messaging daemons. FIG. 8 is a flowchart showing a method for message transmission according to an embodiment of the invention. In step S811, a source daemon identity and an instant message comprising text, graphics, video or audio files is received. Those skilled in the art will appreciate that this step may follow a series of standard procedural steps to communicate with another instant messaging daemon. In step S821, type of the instant message is determined, and if the instant message is an inbound message, the process proceeds to step S831, and if the instant message is an outbound message, the process proceeds to step S841. In step S831, itself daemon identity as an incoming daemon identity, the received source daemon identity, and instant message are transmitted to the message switching unit 112. In step S841, a destination daemon identity is acquired. In step S842, the received instant message is transmitted to an instant messaging daemon corresponding to the destination daemon identity. Those skilled in the art will appreciate that this step may follow a series of standard procedural steps to communicate with destination instant messaging daemon.

Figure 9:
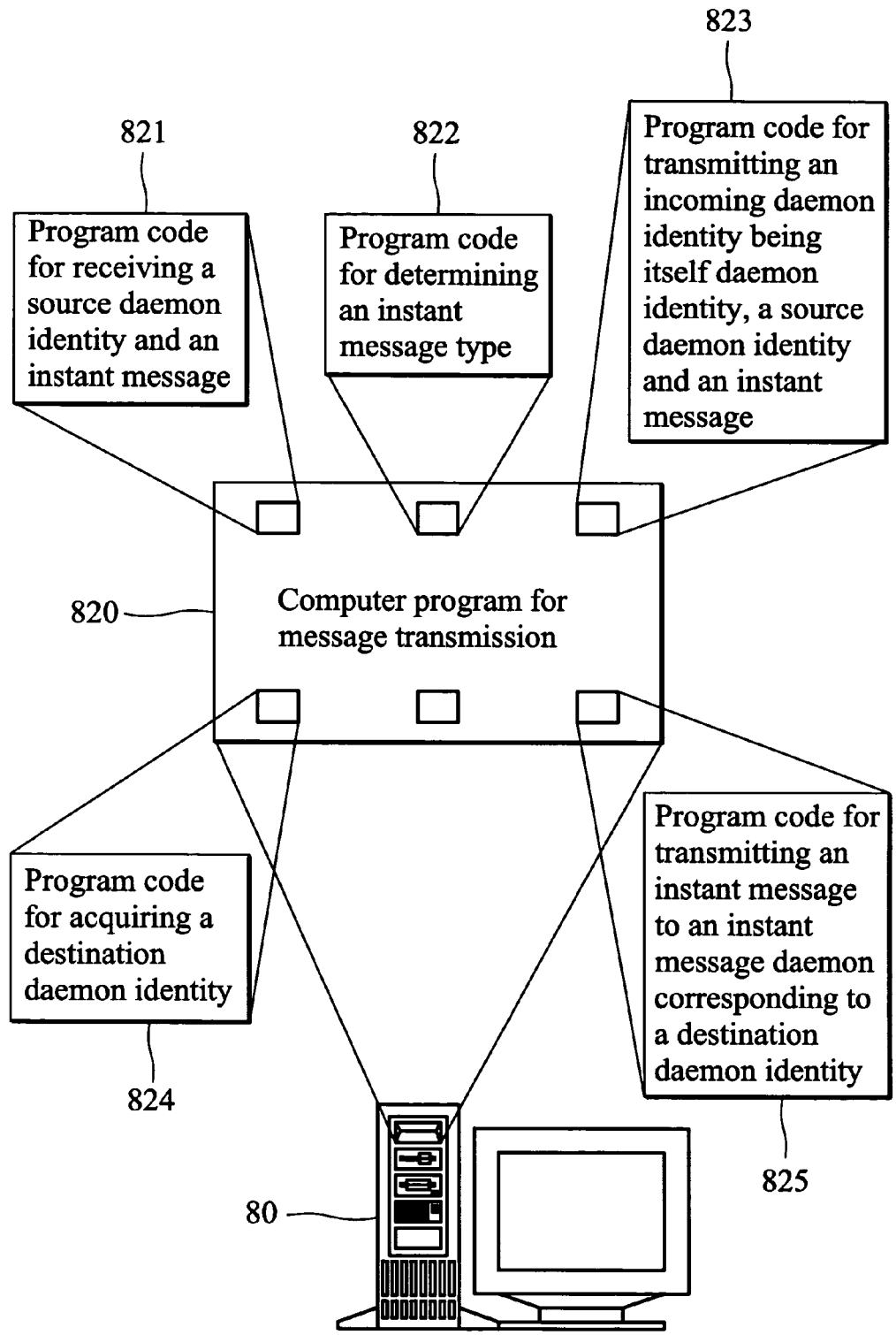
FIG. 9 is a diagram of a storage medium for a computer program providing the method of message transmission according to an embodiment of the invention.

Further provided is a storage medium as shown in FIG. 9 storing a computer program 720 executing the disclosed methods of message transmission. Storage medium 80 comprises computer readable program code comprising at least computer readable program code 821 receiving a source daemon identity and an instant message, computer readable program code 822 determining instant message type, computer readable program code 823 transmitting itself daemon identity as an incoming daemon identity, a source daemon identity and an instant message, computer readable program code 824 acquiring a destination daemon identity, and computer readable program code 825 transmitting an instant message to an instant message daemon corresponding to destination daemon identity.

Figure 10:
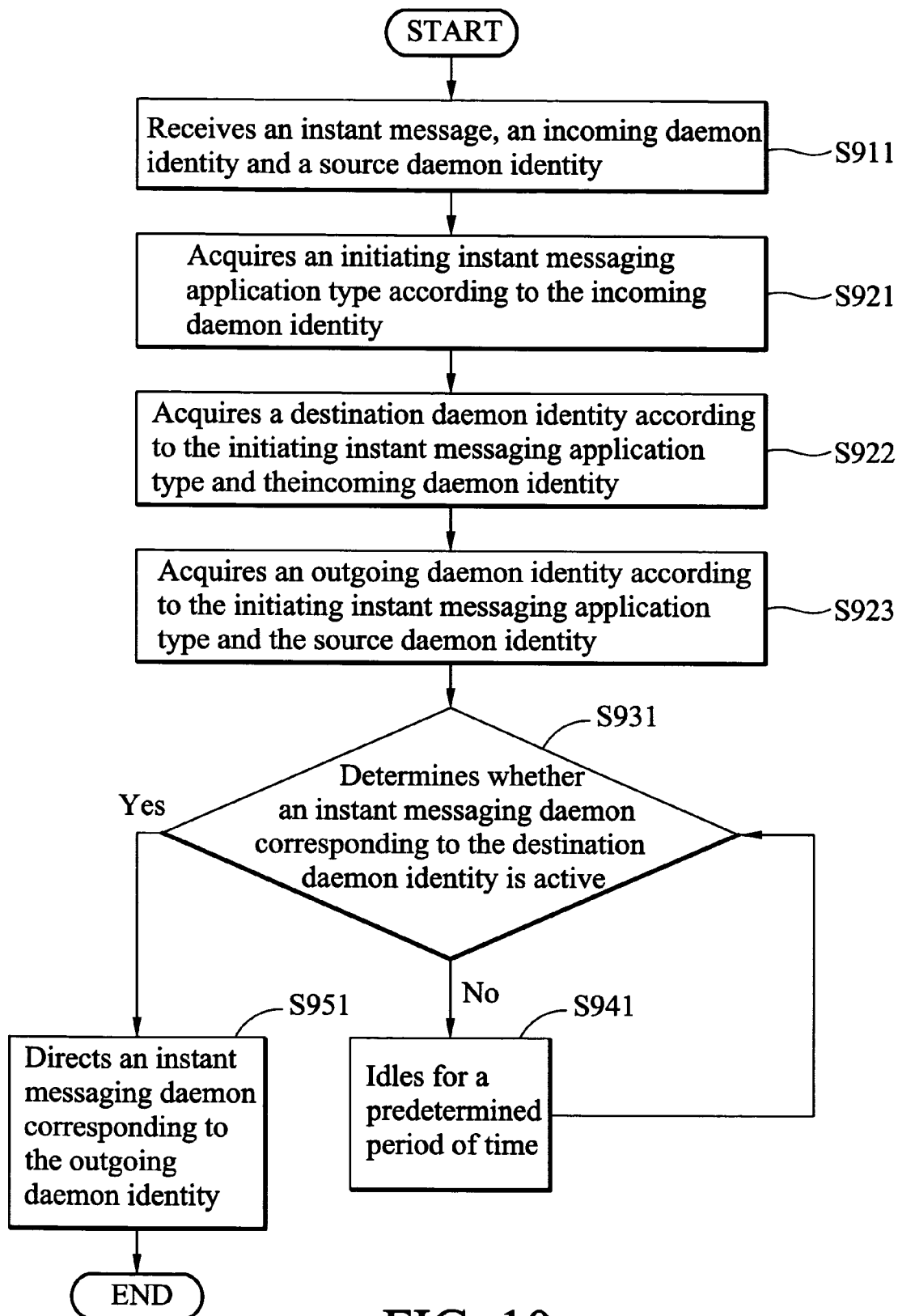
FIG. 10 is a flowchart showing a method for message switching according to an embodiment of the invention.

The message switching unit 112 exchanges text, graphics, video or audio files between differing types of instant messaging daemons. FIG. 10 is a flowchart showing an embodiment of a method for message switching. In step S911 an instant message comprising text, graphics, video or audio files, an incoming daemon identity and a source daemon identity are received. The incoming daemon identity corresponds to an instant messaging daemon in the p2p coordinator 21, and the source daemon identity corresponds to an instant messaging daemon sending the instant message. In step S921, a user account corresponding to the incoming daemon identity is acquired, and subsequently an initiating type of the acquired user account is acquired as an outgoing application type by querying the daemon records. In step S922, a daemon identity corresponding to the outgoing application type and the acquired user account is acquired as a destination daemon identity by querying the daemon records. In step S923, a user account corresponding to the received source daemon identity is acquired, and a daemon identity corresponding to the outgoing application type and the acquired user account is acquired as an outgoing daemon identity by querying the daemon records. In step S931, it is determined whether an instant messaging daemon corresponding to the destination daemon identity is active, and if so, the process proceeds to step S951, and if not, to step S941. Step S941 idles for a predetermined period of time. In step S951, an instant messaging daemon corresponding to the outgoing daemon identity is directed to transmit the received instant message to an instant messaging daemon corresponding to the destination daemon identity.

Figure 11:
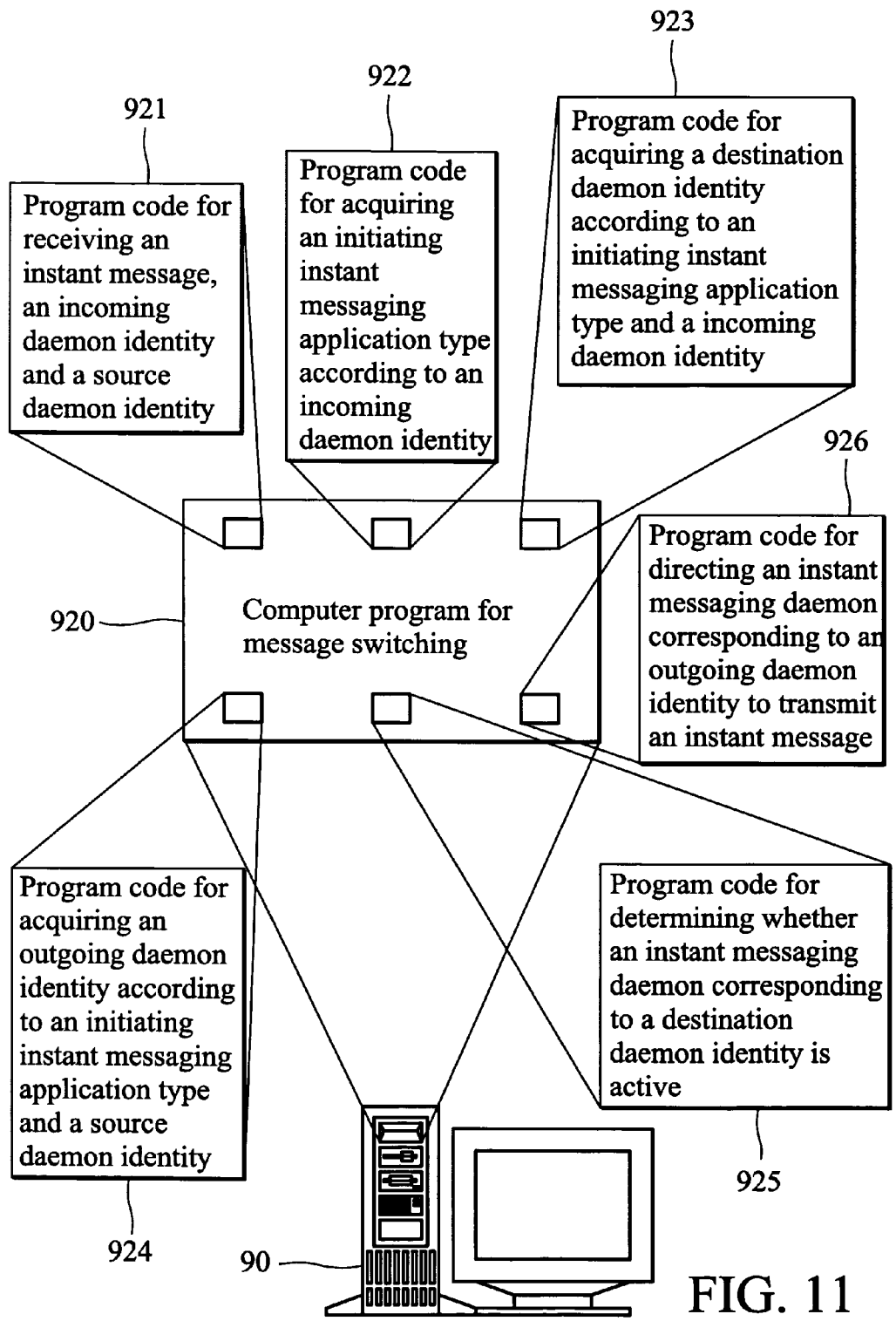
FIG. 11 is a diagram of a storage medium for a computer program providing the method of message switching according to an embodiment of the invention.

Also provided is a storage medium as shown in FIG. 11 storing a computer program 920 for executing the disclosed methods of message switching. Storage medium 90 comprises computer readable program code comprising at least computer readable program code 921 receiving an instant message, a incoming daemon identity and a source daemon identity, computer readable program code 922 acquiring an initiating instant messaging application type according to an incoming daemon identity, computer readable program code 923 acquiring a destination daemon identity according to an initiating instant messaging application type and a incoming daemon identity, computer readable program code 924 acquiring an outgoing daemon identity according to an initiating instant messaging application type and a source daemon identity, computer readable program code 925 determining whether an instant messaging daemon corresponding to a destination daemon identity is active, and computer readable program code 926 directing an instant messaging daemon corresponding to an outgoing daemon identity to transmit an instant message to an instant messaging daemon corresponding to a destination daemon identity.

Details of the methods for message transmission and switching are further described by an example as follows. In step S811, an instant message and a source daemon identity "Ted521@aaa.org" are received from a MSN® Messenger daemon in the computer 22 by the instant messaging daemon (e.g., MSN® Messenger daemon) 113. In steps S821 and S831, itself daemon identity "Ben777@aaa.org" as an incoming daemon identity, the received source daemon identity and instant message are transmitted to the message switching unit 112. In step S911, the instant message, incoming daemon identity "Ben777@aaa.org" and source daemon identity "Ted521@aaa.org" are received by the message switching unit 112. In step S921, an initiating instant messaging application type "ICQ" corresponding to the incoming daemon identity "Ben777@aaa.org" is acquired as an outgoing application type by querying the daemon record 132b. Referring to step S922, a daemon identity "22443311" corresponding to the outgoing application type and the received incoming daemon identity "Ben777@aaa.org" is acquired as a destination daemon identity by querying the daemon record 132b. In step S923, a daemon identity "11332244" corresponding to the outgoing application type and the received source daemon identity "Ted521@aaa.org" is acquired as an outgoing daemon identity by querying the daemon record 132a. In steps S931 and S951, the switching unit 112 determines that an instant messaging daemon corresponding to the destination daemon identity "22443311" is active, and directs an instant messaging daemon corresponding to the outgoing daemon identity "11332244" to transmit the received instant message to an instant messaging daemon corresponding to the destination daemon identity "22443311". In step S811, an instant message are received from the message switching unit 112 by the instant messaging daemon (e.g., ICQ® daemon) 114. In steps S821, S841 and S842, a destination daemon identity "22443311" is acquired, and the received instant message is transmitted to an ICQ® daemon corresponding to the destination daemon identity "22443311" in the computer 24.

The methods and systems disclosed, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in the technology can still make various alterations and modifications without departing from the scope and spirit of this invention. Therefore, the scope of the present invention shall be defined and protected by the following claims and their equivalents.

What is claimed is:

1. A system for peer-to-peer (p2p) communication, comprising:
 a first client, having a first daemon corresponding to a first instant messaging application type and sending an instant message corresponding to the first instant messaging application type using communication protocol corresponding to the first instant messaging application type;
 a second client, having a second daemon corresponding to a second instant messaging application type and using communication protocol corresponding to the second instant messaging application type; and
 a coordinator coupled between the first and second clients, comprising:
  a third daemon receiving the instant message and a first daemon identity corresponding to the first daemon using communication protocol corresponding to the first instant messaging application type, and acquiring a third daemon identity corresponding to the third daemon;
  a message switching unit receiving the instant message, the first daemon identity and the third daemon identity, acquiring the second instant messaging application type corresponding to the third daemon identity, and acquiring a second daemon identity corresponding to the second daemon according to the third daemon identity and the second instant messaging application type; and
  a fourth daemon receiving the instant message and the second daemon identity, and transmitting the instant message to the second daemon corresponding to the second daemon identity using communication protocol corresponding to the second instant messaging application type.

2. The system as claimed in claim 1 wherein the message switching unit acquires a fourth daemon identity corresponding to the fourth daemon and transmits the instant message to the fourth daemon corresponding to the fourth daemon identity.

3. The system as claimed in claim 2 wherein the coordinator further comprises a storage device recording the first daemon identity, the second instant messaging application type and the fourth daemon identity.

4. The system as claimed in claim 3 wherein the message switching unit acquires the fourth daemon identity by querying the record of the first daemon identity, the second instant messaging application type and the fourth daemon identity.

5. The system as claimed in claim 1, wherein the coordinator further comprises a storage device recording the third daemon identity and the second instant messaging application type, and recording the third daemon identity, the second instant messaging application type and the second daemon identity.

6. The system as claimed in claim 5 wherein the message switching unit acquires the second instant messaging application type by querying the record of the third daemon identity and the second instant messaging application type, and acquires the second daemon identity by querying the record of the third daemon identity, the second instant messaging application type and the second daemon identity.

7. The system as claimed in claim 1, wherein the coordinator further comprises a daemon generating unit receiving a first registration message from the first client, generating the fourth daemon for the second instant messaging application type, registering the fourth daemon, and activating the fourth daemon.

8. The system as claimed in claim 1, wherein the coordinator further comprises a daemon generating unit receiving a second registration message from the second client, generating the third daemon for the first instant messaging application type, registering the third daemon, and activating the third daemon.

9. The system as claimed in claim 1 wherein the instant message comprises text, graphics, audio or video files.

10. A method for peer-to-peer (p2p) communication, comprising:
Sending an instant message from a first daemon corresponding to a first instant messaging application type originating with a first client to a second daemon corresponding to a second instant messaging application type originating with a second client via a coordinator;
receiving the instant message, a first daemon identity corresponding to the first daemon, and a third daemon identity by the coordinator, the first daemon identity and the third daemon identity corresponding to the first instant messaging application type;
acquiring the second instant messaging application type corresponding to the third daemon identity by the coordinator;
acquiring a second daemon identity corresponding to the second daemon according to the third daemon identity and the second instant messaging application type by the coordinator; and
directing a fourth daemon to transmit the instant message to the second daemon corresponding to the second daemon identity using communication protocol corresponding to the second instant messaging application type by the coordinator.

11. The method as claimed in claim 10, further comprising:
acquiring a fourth daemon identity according to the first daemon identity and the second instant messaging application type; and
directing the fourth daemon corresponding to the fourth daemon identity.

12. The method as claimed in claim 11 wherein the acquisition of the fourth daemon identity comprising querying the record of the first daemon identity, the second instant messaging application type and the fourth daemon identity from a storage device.

13. The method as claimed in claim 10 wherein the acquisition of the second instant messaging application type comprising querying the record of the third daemon identity and the second instant messaging application type from a storage device.

14. The method as claimed in claim 10 wherein the acquisition of the second daemon identity comprising querying the record of the third daemon identity, the second instant messaging application type and the second daemon identity from a storage device.

15. The method as claimed in claim 10, further comprising:
receiving a first registration message from the first client;
generating the fourth daemon for the second instant messaging application type;
registering the fourth daemon; and
activating the fourth daemon.

16. The method as claimed in claim 10, further comprising:
receiving a second registration message from the second client;
generating the third daemon for the first instant messaging application type;
registering the third daemon; and
activating the third daemon.

17. The method as claimed in claim 10 wherein the instant message comprises text, graphics, audio or video files.

18. A machine-readable storage medium storing a computer program which, when executed, performs a method for peer-to-peer (p2p) communication, the method comprising:
sending an instant message from a first daemon corresponding to a first instant messaging application type originating with a first client to a second daemon corresponding to a second instant messaging application type originating with a second client via a coordinator;
receiving the instant message, a first daemon identity corresponding to the first daemon, and a third daemon identity by the coordinator, the first daemon identity and the third daemon identity corresponding to the first instant messaging application type;
acquiring the second instant messaging application type corresponding to the third daemon identity by the coordinator;
acquiring a second daemon identity corresponding to the second daemon according to the third daemon identity and the second instant messaging application type by the coordinator; and
directing a fourth daemon to transmit the instant message to the second daemon corresponding to the second daemon identity using communication protocol corresponding to the second instant messaging application type by the coordinator.

* * * * *